United States Patent Office 3,563,857
Patented Feb. 16, 1971

3,563,857
PROCESS FOR PRODUCING L-GLUTAMIC
ACID BY FERMENTATION
Toshikazu Oki, Fujisawa-shi, Yukio Nishimura, Yashiro-shi, Yoshio Sayama and Hisao Takemi, Yokohama-shi, Atsuo Kitai, Kamakura-shi, and Asaichiro Ozaki, Tokyo, Japan, assignors to Sanraku Ocean Co., Ltd., and Ajinomoto Co., Inc., both of Tokyo, Japan
No Drawing. Filed Mar. 15, 1968, Ser. No. 713,323
Claims priority, application Japan, Mar. 20, 1967, 42/17,002; Dec. 29, 1967, 43/84,433, 43/84,434; Jan. 18, 1968, 43/2,334
Int. Cl. C12b 3/00
U.S. Cl. 195—49                                      10 Claims

ABSTRACT OF THE DISCLOSURE

Many yeasts and bacteria are capable of growth on otherwise conventional culture media which contain ethanol as the principal source of carbon, and produce L-glutamic acid which may be recovered in commercially useful amounts. The medium should contain no more than 10% ethanol for good yields, and the ethanol content may be replenished by mixing the ethanol with the aeration gas.

This invention relates to the production of L-glutamic acid by microbial fermentation of media containing a source of assimilable carbon, a source of assimilable nitrogen, and various minor nutrients necessary for growth of the microorganisms.

Many microorganisms are known to produce L-glutamic acid when growing on such media. Carbohydrates are usually employed as a source of carbon, but other organic materials have been employed heretofore as principal sources of assimilable carbon.

We now have found that yeasts and bacteria of widely varying genera are capable of producing L-glutamic acid on media whose sole or principal source of assimilable carbon is ethanol. The strains of microorganisms suitable for producing L-glutamic acid according to this invention do not share readily recognizable features other than their ability of growing on a culture medium containing ethanol as the principal source of carbon, and of producing L-glutamic acid by their metabolism on such a medium. Employing screening tests based on these properties, we have found numerous suitable microorganisms in nature and in culture collections without exhausting the field of search.

Table 1 here below lists strains of microorganisms, their growing ability on an ethanol-bearing culture medium and the yield of L-glutamic acid accumulated in the medium during growth.

The media employed were semi-solid and had the following compositions:

(A) Culture medium of yeasts:
   Ethyl alcohol—2.0%
   $(NH_4)_2HPO_4$—1.0%
   $K_2HPO_4$—0.2%
   $MgSO_4 \cdot 7H_2O$—0.05%
   $Fe^{++}$—2 p.p.m.
   $Mn^{++}$—2 p.p.m.
   Yeast extract—0.01%
   Agar—1.5%
   pH—6.0

(B) Culture medium for bacteria:
   Ethyl alcohol—2.0%
   $KH_2PO_4$—0.2%
   $K_2HPO_4$—0.7%
   $(NH_4)_2SO_4$—0.3%

(B) Culture medium for bacteria:
   $MgSO_4 \cdot 7H_2O$—0.05%
   Yeast extract—0.01%
   Biotin—10 γ/l.
   Thiamine–HCl—100 γ/l.
   $Fe^{++}$—2 p.p.m.
   $Mn^{++}$—2 p.p.m.
   Agar—1.5%
   pH—7.2

Using conventional techniques, plate cultures of the microorganisms were incubated for five days at 28° C. A piece of the medium about 5–7 mm. in diameter was then cut out, its liquid content was transferred to filter paper by diffusion, and the glutamic acid content of the culture medium was calculated from the results of chromatographic analysis carried out on the dried filter paper. The growth of the microorganisms was determined by visual observation. The results are evaluated in Table 1 on an arbitrary, but reproducible scale, the symbols used having the following meaning:

++++ excellent      + significant
+++ good            ± trace
++ fair

TABLE 1

| Strains | Microbial growth | L-glutamic acid yield |
|---|---|---|
| Brevibacterium saccharolyticum No. 7636 (ATCC 14066) | +++ | +++ |
| Brevibacterium devaricatum No. 1627 (NRRL 2311) | ++++ | +++ |
| Brevibacterium flavum No. 2247 (ATCC 14067) | ++ | + |
| Brevibacterium lactofermentum (ATCC 13869) | +++ | ++ |
| Micrococcus glutamicus No. 534 (ATCC 13032) | + | ± |
| Micrococcus varians (ATCC 399) | +++ | ++ |
| Micrococcus freudenreichi ATCC 8459 | + | + |
| Microbacterium lacticum ATCC 8180 | + | + |
| Corynebacterium equi ATCC 6939 | ++ | + |
| Corynebacterium acetoacidphilum No. 410 (ATCC 13870) | + | + |
| Corynebacterium lilium NRRL 2243 | + | + |
| Corynebacterium herculis ATCC 13868 | ++ | ++ |
| Pseudomonas decunhae B 402 (ATCC 21192) | ++ | + |
| Pseudomonas desmolytica ATCC 8062 | + | ± |
| Pseudomonas ovalis IAM 1200 | +++ | + |
| Pseudomonas ovalis Chester: | | |
| IAM 1003 | +++ | ± |
| IAM 1090 | +++ | ± |
| IAM 1235 | +++ | ± |
| Alcaligenes viscolactis ATCC 9036 | +++ | ++ |
| Alcaligenes metalcaligenes IPR AMU-9 | +++ | ± |
| Bacillus megaterium IAM 1032 | +++ | ± |
| Bacillus pumilus IFO 3813 | +++ | ± |
| Bacillus cereus IAM 1208 | +++ | ± |
| Bacillus subtilis IAM 1169 | + | ± |
| Arthrobacter citreus ATCC 11624 | ++ | ± |
| Arthrobacter aurescens ATCC 13344 | ++ | ± |
| Arthrobacter ureafaciens ATCC 7652 | +++ | ± |
| Aerobacter aerogenes IAM 1063 | ++ | ± |
| Aerobacter cloacae IAM 1063 | ++ | ± |
| Escherichia coli IFO 3806 | +++ | ++ |
| Xanthomonas capestris ATCC 6402 | +++ | + |
| Xanthomonas phaseoli ATCC 11766 | ++ | ± |
| Proteus vulgaris AHU 1470 | ++ | + |
| Proteus rettgeri IFO 3850 | ++ | ± |
| Flavobacterium aquatile IFO 3773 | +++ | ± |
| Flavobacterium proteus ATCC 12841 | ++ | ± |
| Achromobacter liquidum IFO 3084 | ++ | ± |
| Serratia marcescens ATCC 4002 | +++ | + |
| Saccharomyces fermentati Y 96 (ATCC 20100) | ++ | +++ |
| Saccharomyces cerevisiae IAM 4274 | +++ | ± |
| Saccharomyces cerevisiae ATCC 7752 | +++ | + |
| Candida utilis IFO 0610 Y 151 | +++ | ++ |
| Candida utilis IAM 4215 | +++ | ++ |
| Candida utilis ATCC 9226 | +++ | ++ |
| Candida lipolytica ATCC 8661 | +++ | ++ |
| Candida krusei IAM 4801 | ++++ | + |
| Candida albicans IAM 4905 | +++ | + |
| Hansenula schneggii var. kinshii IAM 4024 | ++++ | ± |
| Mycotorula japonica IAM 4185 | ++ | ++ |
| Pichia farinosa Hansen IAM 4327 | +++ | ++ |
| Pichia membranaefaciens 0202 (ATCC 20101) | ++ | +++ |
| Pichia membranaefaciens IAM 4025 | +++ | ++ |
| Torula rubra IFO 0395 | ++ | ± |
| Torulaspora delbruecki Lindner HUT 7163 | + | ± |
| Torulopsis kefyr ATCC 4648 | ++ | ++ |
| Torulopsis candida ATCC 2560 | ++ | ± |

As is evident from Table 1, L-glutamic acid is being produced from ethanol by strains of yeasts and bacteria. Some of the strains have been newly isolated. The glutamic acid yields obtained vary greatly from one strain to the other.

When the ability of microorganisms capable of producing L-glutamic acid from ethanol was compared with their ability of producing the acid from media containing glucose as a carbon source, no significant pattern of correlation was found. Some microorganisms which convert ethanol to glutamic acid at high yields perform poorly on glucose, and vice versa.

The ingredients of the culture medium other than ethanol are not critical in the method of our invention. We have used a wide variety of nitrogen sources, including ammonium sulfate, ammonium nitrate, ammonium carbonate, ammonium chloride, aqueous ammonia, and urea without unexpected difficulties. Other nitrogen bearing substances such as amino acids, corn steep liquor, Aji-eki (soybean hydrolyzate), bouillon, peptone, and yeast extract produce the usual results, as do the conventional trace elements, vitamins and other secondary nutrients essential for microbial growth in a known manner.

The pH of the culture medium should be kept between 6 and 9 during fermentation, and is preferably held initially between 7 and 8. The temperature should be between 20 and 35° C., the optimum temperature varying from one microorganism to the other and the lower portion of the range being best for a majority of the listed microorganisms.

The fermentation is carried out under aerobic conditions and requires generally 2 to 4 days for best results.

The listed results were obtained by culturing the microorganisms referred to in Table 2 on 20 ml. batches of culture medium in 500 ml. Sakaguchi flasks at 25–32° C. for 66–72 hours with shaking at 125 r.p.m. The pH of each culture medium was kept between 7 and 8 by adding from time to time 0.4 ml. of a 3:1 mixture of 99.5% ethanol and 50% (weight per volume) aqueous urea solution.

The culture media employed initially contained ethanol, as listed in Table 2, and the following ingredients:

|  | (A) | (B) | (C) |
|---|---|---|---|
| $KH_2PO_4$, percent | 0.2 | 0.1 | 0.2 |
| $K_2HPO_4$, percent | 0.7 |  | 0.7 |
| $(NH_4)_2SO_4$, percent | 0.1 |  | 0.5 |
| Urea, percent |  | 0.25 |  |
| Corn steep liquor, percent | 0.4 |  |  |
| Aji-eki (soybean hydrolysate, total N percent 2.42), percent |  | 1.5 |  |
| Biotin, $\gamma/l$ | 0–10 | 5–50 |  |
| Thiamine-HCl, $\gamma/l$ | 100 | 100 |  |
| $MgSO_4 \cdot 7H_2O$, percent | 0.01 | 0.05 | 0.05 |
| $Mn^{++}$, p.p.m. | 2 | 2 | 2 |
| $Fe^{++}$, p.p.m. | 2 | 2 | 2 |
| Yeast extract, percent |  |  | 0.02 |
| $(NH_4)_2HPO_4$, percent |  |  | 0.5 |

The L-glutamic acid in the fermentation broth was determined by bioassay, using *L. arabinosus* 17–5. Ethanol in the broth and in the waste gas was determined by gas chromatography.

TABLE 2

| Strains | Ethanol, percent | | | | L-glut. acid, g./dl. | Medium |
|---|---|---|---|---|---|---|
|  | Init'l | Added | Resid. | Evap. |  |  |
| *Brev. saccharolyticum* No. 7636, ATCC 14066 | 1.5 | 3.0 | 0.1 | 0.8 | 1.05 | A |
|  | 2.0 | 2.0 |  |  | 0.94 | A |
|  | 4.0 |  | 0.7 | 1.2 | 0.70 | B |
| *Brev. divaricatum* No. 1627, NRRL 2311 | 1.5 | 12.0 | 2.4 | 0.9 | 4.97 | B |
|  | 2.0 | 8.0 | 2.0 | 1.4 | 3.70 | A |
|  | 4.0 | 4.0 | 1.2 | 0.7 | 2.60 | B |
|  | 5.0 |  | 0.4 |  | 1.71 | A |
| *Brev. flavum* 2247 ATCC 14067 | 1.5 | 6.0 | 0.7 |  | 2.14 | A |
|  | 4.0 | 4.0 | 1.4 |  | 1.86 | B |
|  | 4.0 |  | 0.5 |  | 1.03 | B |
| *Pichia membranaefaciens* 0202 (ATCC 20101) | 1.0 | 6.0 | 0.2 | 0.4 | 0.85 | C |
|  | 2.0 | 8.0 | 0.7 | 0.9 | 0.75 | C |
|  | 4.0 |  |  |  | 0.25 | C |
|  | 6.0 |  |  |  | 0.46 | C |
|  | 10.0 |  | 1.3 | 1.8 | 0.51 | C |
| *Candida lypolytica* ATCC 8661 | 1.0 | 10.0 | 0.7 | 0.5 | 0.90 | C |
|  | 2.0 | 8.0 | 1.7 |  | 0.70 | C |
|  | 4.0 |  | 0.9 |  | 0.21 | C |
|  | 8.0 |  | 1.2 |  | 0.54 | C |
|  | 10.0 |  | 2.1 | 1.8 | 0.42 | C |

The tolerance of the microorganisms for ethanol varies from strain to strain, and too much ethanol in the medium unfavorably affects the growth of many microorganisms. The ethanol losses by evaporation also increase with the ethanol concentration in the medium, and an upper concentration limit of 10% is advisable. It is better therefore that the concentration of ethyl alcohol be not brought up high at one time during fermentation; more precisely it had better be maintained less than 10%. It is suggested, then, that a considerably lower concentration of ethyl alcohol be initially established and maintained during fermentation by intermittent feeding of ethyl alcohol corresponding to the rate of consumption.

The influence of the initial alcohol concentration and of the amount of alcohol supplied during fermentation (in weight percent of the initial culture medium) on the yield of L-glutamic acid is evident from Table 2 which also lists the residual alcohol content at the end of the fermentation period and the alcohol lost by evaporation.

The advantages of gradually adding the ethanol to the fermentation mixture are evident from Table 2.

If it is not convenient to add liquid ethanol to the culture medium, ethanol vapors may be mixed with the aeration gas. Liquid ethanol may be injected into the gas stream, or the gas may be saturated with ethanol by bubbling it through the liquid alcohol.

A portion of the ethanol in the nutrient media of the invention may be replaced by other carbon sources in minor amounts in seed cultures or in the ultimate fermentation mixtures. Hydrocarbons, glycols, and acetic acid have been fermented successfully in combination with major amounts of ethanol. Table 3 lists various combinations of microorganisms and carbon sources together with the yields of L-glutamic acid in the fermentation broth and the optical density of the broth at 610 microns when diluted with water to 20 times its original volume, as a measure of microbial growth. The amounts of ethanol listed were added gradually during fermentation.

TABLE 3

| Strains | Carbon source,[1] percent | | | nol, | L-glut. g./dl. | density |
|---|---|---|---|---|---|---|
| | 1 | 2 | 3 | | | |
| Brev. divaricatum NRRL 2311 | | | | 10 | 4.55 | 0.65 |
| Brev. saccharolyticum 7636 ATCC 14066 | | 2.0 | | 6 | 3.71 | 0.78 |
| Brev. flavum 2247 ATCC 14067 | | 1.5 | | 10 | 4.70 | 0.81 |
| Brev. lactofermentum 2256 ATCC 13869 | | 2.0 | | 8 | 2.57 | 0.62 |
| Coryn. hoagii ATCC 7005 | 1.5 | | | 4 | 0.24 | 0.47 |
| Coryn. equi ATCC 6939 | | | | 6 | 0.51 | 0.60 |
| Pseud. dacunhae B402 (ATCC 21192) | | | 1.5 | 4 | 0.41 | 0.37 |
| Candida lipolytica ATCC 8661 | 1.0 | | | 6 | 0.62 | 0.91 |
| Pichia membranaefaciens 0202 (ATCC 20101) | 1.0 | | | 6 | 0.59 | 0.87 |

[1] 1 Normal alkanes; 2 Acetic acid; 3 Propyleneglycol.

The culture medium employed differed from that listed under (B) above with reference to Table 2 by a lower biotin content (0–10 γ/l). The procedure was otherwise substantially as described with reference to Table 2, the pH being maintained by additions of 15% aqueous ammonium hydroxide solution, and a temperature of 25–30° C. being maintained during a fermentation period of 48–60 hours.

The L-glutamic acid yield can be increased under otherwise identical conditions by the presence of higher fatty acids and non-ionic surface active agents in the fermentation medium. A wide variety of non-ionic surfactants has been found effective, including polyoxyethylene sorbitan esters, polyethyleneglycol fatty acid esters, sorbitan fatty acid esters, sucrose fatty acid esters, monoglycerides, and polyoxyethylene alkyl ethers. The effects of non-ionic surfactants and of higher fatty acids having 14 to 18 carbon atoms on six strains of microorganisms are illustrated by the data in Table 4 below.

(B) For yeasts:
$(NH_4)_2SO_4$—1.0%
$K_2HPO_4$—0.2%
$MgSO_4 \cdot 7H_2O$—0.05%
$Fe^{++}$—2 p.p.m.
$Mn^{++}$—2 p.p.m.
Yeast extract—0.01%
Ethanol—1.0%

The microorganisms were inoculated on the culture media which were then kept at 28° C. with shaking for 18 hours. Ten percent of each broth so obtained was transferred to another medium of the same composition and further cultured for 42 hours at 28° C. Ethanol was added in an amount of 1% by volume to each medium after 10, 20, and 30 hours. 15% aqueous ammonia was added to keep the pH between 6 and 9. The surfactants and fatty acids listed in Table 4 were added to the fermentation media in the concentrations indicated after 10 hours of cultivation.

TABLE 4

| Additives | Concentration, percent | Microorganism | | | | | |
|---|---|---|---|---|---|---|---|
| | | 1 | 2 | 3 | 4 | 5 | 6 |
| Polyoxyethylene sorbitan monostearate | 0.02 | +++ | +++ | ++ | +++ | ++ | +++ |
| Polyoxyethylene sorbitan monopalmitate | 0.02 | +++ | ++ | +++ | +++ | +++ | ++ |
| Sorbitan monopalmitate | 0.02 | ++ | + | ++ | + | ++ | + |
| Sorbitan monooleate | 0.02 | ++ | + | + | ++ | ++ | + |
| Sucrose monostearate | 0.05 | ++ | ++ | + | ++ | + | ++ |
| Lauric acid monoglyceride | 0.01 | ++ | + | + | + | ++ | ++ |
| Stearic acid monoglyceride | 0.01 | + | + | + | + | ++ | + |
| Polyethyleneglycol monostearate | 0.1 | +++ | +++ | +++ | ++ | +++ | +++ |
| Polyethyleneglycol monopalmitate | 0.1 | +++ | +++ | +++ | ++ | +++ | +++ |
| Polyethyleneglycol monooleate | 0.1 | ++ | +++ | +++ | +++ | +++ | +++ |
| Polyoxyethylene stearyl ether | 0.05 | +++ | ++ | ++ | ++ | +++ | +++ |
| Polyoxyethylene lauryl ether | 0.05 | +++ | +++ | +++ | ++ | +++ | +++ |
| Polyoxyethylene cetyl ether | 0.05 | ++ | + | + | + | + | + |
| Myristic acid | 0.02 | + | + | + | + | + | + |
| Stearic acid | 0.02 | ++ | ++ | + | + | ++ | ++ |
| Oleic acid | 0.02 | + | + | ++ | ++ | ++ | ++ |
| Palmitic acid | 0.02 | ++ | ++ | + | ++ | + | + |
| Margaric acid | 0.02 | ++ | ++ | ++ | + | + | + |
| None (control) | | + | + | + | + | + | + |

The microorganisms are identified by numerals in the table as follows:

1—*Bevibacterium divaricatum* NRRL 2311
2—*Corynebacterium hoagii* ATCC 7005
3—*Pseudomonas ovalis* IAM 1200
4—*Alcaligenes viscolactis* ATCC 9036
5—*Candida utilis* ATCC 9226
6—*Saccharomyes fermentati* Y96 (ATCC 20100)

The culture media respectively employed for bacteria and yeasts had the following initial compositions:

(A) For bacteria:
$(NH_4)_2CO$—0.5%
$(NH_4)_2SO_4$—0.5%
$KH_2PO_4$—0.1%
$MgSO_4 \cdot 7H_2O$—0.5%
Aji-eki (soybean hydrolysate, total N 2.42%)—1.5%
$Mn^{++}$—2 p.p.m.
$Fe^{++}$—2 p.p.m.
Biotin—5 γ/l.
Thiamine-HCl—100 γ/l.
Ethanol—1.0%

The results obtained are indicated in Table 4 by the following symbols:

+ as control
++ better than control
+++ much better than control

It has been found that the effects of the addition agents listed in Table 4 are approximately additive, so that they may be used singly or in mixtures with each other. Their concentration should generally be between 0.0001 and 0.5%, based on the weight of the original culture medium, and they may be added to the medium at the beginning of fermentation or gradually over the fermentation period. The best results are obtained when the surfactant or fatty acid is added between the start of the fermentation period and the logarithmic growth phase. The effects of the time of addition and of the amounts added on the gultamic acid yields are illustrated for polyoxyethylene sorbitan monostearate and four different microorganisms in Table 5.

The culture medium described with reference to Table 4 was employed and other conditions were generally as described with reference to Table 2.

TABLE 5

| Microorganism | Add. time, hrs. | Additive, percent | | | | | | |
| --- | --- | --- | --- | --- | --- | --- | --- | --- |
| | | 0.005 | 0.01 | 0.02 | 0.05 | 0.1 | 0.2 | None |
| | | L-glutamic acid, g./dl. | | | | | | |
| Brev. divaricatum NRRL 2311 | 8 | 6.01 | 5.70 | 4.29 | 4.25 | 5.11 | 3.75 | 4.05 |
| | 12 | 6.02 | 5.92 | 6.12 | 5.70 | 6.04 | 4.38 | |
| | 16 | 5.79 | 5.91 | 6.45 | 6.25 | 5.29 | 5.20 | |
| Pichia menbranaefaciens 0202 (ATCC 20101) | 10 | 0.50 | 0.47 | 0.79 | 0.97 | 0.78 | 1.10 | 0.52 |
| | 14 | 0.53 | 0.61 | 1.04 | 0.94 | 1.30 | 1.13 | |
| | 18 | 0.46 | 0.55 | 0.93 | 0.83 | 1.02 | 0.97 | |
| Corynebacterium equi ATCC 6939 | 0 | 0.75 | 0.89 | 1.00 | 0.60 | 0.45 | 0.51 | 0.85 |
| | 6 | 1.10 | 1.05 | 1.13 | 1.11 | 0.78 | 0.62 | |
| | 10 | 1.05 | 1.10 | 1.70 | 1.73 | 1.01 | 0.57 | |
| | 14 | 0.81 | 1.15 | 1.63 | 1.90 | 1.40 | 0.71 | |
| | 18 | 0.97 | 0.98 | 1.52 | 1.75 | 1.60 | 0.84 | |
| Candida lipolytica ATCC 8661 | 0 | 0.68 | 0.61 | 0.53 | 0.64 | 0.50 | 0.42 | 0.47 |
| | 6 | 0.72 | 0.90 | 0.70 | 0.82 | 0.94 | 0.48 | |
| | 10 | 0.42 | 0.87 | 0.92 | 0.96 | 1.07 | 0.75 | |
| | 14 | 0.52 | 0.70 | 0.74 | 1.08 | 1.12 | 0.82 | |
| | 18 | 0.49 | 0.65 | 0.67 | 0.93 | 1.05 | 0.69 | |

The following examples are further illustrative of this invention, but it will be understood that the invention is not limited to the examples.

EXAMPLE 1

500 ml. seed culture medium were prepared with the following composition:

$KH_2PO_4$—0.2%
$K_2HPO_4$—0.7%
$MgSO_4 \cdot 7H_2O$—0.01%
$(NH_4)_2SO_4$—0.1%
Biotin—2 γ/l.
Thiamine-HCl—100 γ/l.
Corn steep liquor—0.4%
Urea—0.5%

The medium was sterilized, mixed with ethanol in an amount of 1% by volume, inoculated with *Brevibacterium saccharolyticum* No. 7636 (ATCC 14066), and cultivated with shaking at 32° C. for 18 hours.

The seed culture broth so obtained was transferred (10% by volume) to a main culture medium of the composition given below which was cultivated with shaking at 32° C.:

Ethanol—2.0%
$(NH_4)_2SO_4$—0.1%
Urea—0.5%
$KH_2PO_4$—0.2%
$K_2HPO_4$—0.7%
$MgSO_4 \cdot 7H_2O$—0.01%
Corn steep liquor—0.4%
Biotin—2 γ/l.
Thiamine-HCl—100 γ/l.

50% urea solution was added during fermentation as needed to maintain the pH between 6 and 8, and ethanol was supplied four times at a rate of 2% to make up for consumption. After 72 hours of fermentation, the concentration of L-glutamic acid in the culture medium amounted to 4.25 g./dl.

EXAMPLE 2

20 ml. of seed culture medium were sterilized in a 500-ml. Sakaguchi flask, the medium having the following composition:

$KH_2PO_4$—0.2%
$K_2HPO_4$—0.7%
$MgSO_4 \cdot 7H_2O$—0.01%
$(NH_4)_2SO_4$—0.1%
Biotin—2 γ/l.
Thiamine-HCl—100 γ/l.
Corn steep liquor—0.4%
Ethyl alcohol—2.0%
Urea—0.5%

*Brevibacterium lactofermentum* No. 2256 (ATCC 13869) was inoculated into the medium and cultivated at 30° C. for 18 hours, with shaking.

The broth so prepared was inoculated into a main culture medium in an amount of 10%, and the mixture was cultivated at 25° C. for 60 hours with shaking. The main culture medium had the following composition:

Ethanol—1.5%
Glucose—0.5%
$(NH_4)_2SO_4$—0.1%
Urea—0.25%
$KH_2PO_4$—0.2%
$K_2HPO_4$—0.7%
$MgSO_4 \cdot 7H_2O$—0.01%
Corn steep liquor—0.4%
Biotin—5 γ/l.
Thiamine-HCl—100 γ/l.

During the fermentation, the pH was kept at 6 to 9 with 50% urea solution, and 1.5% ethanol was added seven times. At the end of the cultivation period, L-glutamic acid accumulated in the culture broth amounted to 5.42 g./dl.

EXAMPLE 3

A culture broth of *Micrococcus valians* ATCC 399 cutivated in a seed culture medium composed of bouillon 1.0%, polypepton 1.0%, and NaCl 0.5%, at 30° C. for 18 hours was inoculated into a main culture medium whose composition was:

Black strap molasses—1.0%
$(NH_4)_2SO_4$—1.0%
$KH_2PO_4$—0.2%
$MgSO_4 \cdot 7H_2O$—0.05%
Aji-eki (soybean hydrolysate, total N 2.42%)—2.0%
$Fe^{++}$—2 p.p.m.
$Mn^{++}$—2 p.p.m.
$CaCO_3$—1.5%

The medium was held at 30° C., and 2% ethanol were added after 10, 24 and 48 hours. After 72 hours of cultivation, the amount of L-glutamic acid accumulated in the culture broth was 1.18 g./dl.

EXAMPLE 4

2 ml. of seed culture broth of *Pichia membranaefaciens* 0202 (ATCC 20101) in a medium consisting of $(NH_4)_2HPO_4$ 0.5%

$KH_2PO_4$ 0.2%, $MgSO_4 \cdot 7H_2O$ 0.05%, yeast extract 0.05% and ethanol 1.0%, held at 30° C. for 20 hours with shaking was inoculated into 20 ml. of a main culture medium in a 500-ml. Sakaguchi flask, and the mixture cultivated at 28° C. with shaking, the medium being composed of:

Ethanol—3.0%
$(NH_4)_2SO_4$—0.5%
$(NH_4)_2HPO_4$—0.5%
$KH_2PO_4$—0.2%
$K_2HPO_4$—0.7%
$MgSO_4 \cdot 7H_2O$—0.05%
$Mn^{++}$—2 p.p.m.
$Fe^{++}$—2 p.p.m.
Yeast extract—0.02%
pH—6.5

After 24 hours of cultivation, 3% ethanol and 1.0% $(NH_4)_2HPO_4$ were added. At the end of a 48-hour fermentation period, the L-glutamic acid content of the broth was 0.85 g./dl.

EXAMPLE 5

*Saccharomyces fermentati* Y96 (ATCC 20100) was cultivated in a medium consisting of: Yeast extract 0.3% polypepton 0.1%, malt extract 0.3% and ethanol 1.0%, pH 6, and further cultivated in the same culture medium and by the same method as in Example 4.

At the end of the 48-hour fermentation period, the L-glutamic acid in the fermented broth amounted to 0.41 g./dl.

EXAMPLE 6

20 ml. of a seed culture medium consisting of:

$KH_2PO_4$—0.1%
$MgSO_4 \cdot 7H_2O$—0.05%
$(NH_4)_2SO_4$—0.1%
Urea—0.25%
Aji-eki—1.5%
Thiamine-HCl—100 γ/l.
Biotin—2 γ/l.
$Mn^{++}$—2 p.p.m.
$Fe^{++}$—2 p.p.m.

were inoculated in a 500-ml. Sakaguchi flask with *Brevibacterium divaricatum* No. 1627 (NRRL 2311) and cultivated with shaking at 30° C. for 20 hours after the addition of 1% ethanol.

The culture broth was inoculated at a rate of 10% into a main culture medium containing:

Ethanol—1.5%
Urea—0.25%
$KH_2PO_4$—0.1%
$MgSO_4 \cdot 7H_2O$—0.05%
Aji-eki—1.5%
Biotin—5 γ/l.
Thiamine-HCl—100 γ/l.
$Fe^{++}$—2 p.p.m.
$Mn^{++}$—2 p.p.m.

During cultivation at 25° C., 1.5% ethanol was added 8 times and 50% urea solution as needed to hold the pH between 6 and 8. 0.02% polyoxyethylene sorbitan monostearate was added after 8 hours of cultivation. After four days, the L-glutamic acid accumulated in the fermented broth reached 6.25 g./dl.

EXAMPLE 7

A seed culture medium prepared as in Example 5 was inoculated with *Saccharomyces cerevisiae* ATCC 7752 and cultivated at 30° C. for 20 hours with shaking. The 300 ml. of the culture broth so obtained were inoculated into 5 liters of a main culture medium composed of:

| | Percent |
|---|---|
| Ethanol | 0.2 |
| $(NH_4)_2SO_4$ | 0.5 |
| $(NH_4)_2HPO_4$ | 0.5 |
| $K_2HPO_4$ | 0.1 |
| $KH_2PO_4$ | 0.2 |
| $MgSO_4 \cdot 7H_2O$ | 0.05 |
| Yeast extract | 0.02 |
| pH 6.5. | |

The medium was placed in a 10-liter jar-fermentor and the fermentation was carried out at 30° C. with the air flowing at 10 liters/min. and stirring at 500 r.p.m. After 20 hours of fermentation, ethanol was fed to the medium by bubbling the air of aeration through ethanol into the fermentor. Separately, 0.5% $(NH_4)_2HPO_4$ was added, and the pH maintained with 15% aqueous ammonia solution. 0.05% polyoxyethylene sorbitan monostearate was added after 10 hours. After 42 hours, 0.62 g./dl. L-glutamic acid was obtained in the broth.

EXAMPLE 8

Using *Torulopsis kefyr* ATCC 4648, the procedure described in Example 7 was repeated. After 8 hours, 0.03% polyoxyethylene monopalmitate was added; and at the end of the 48-hour fermentation, the concentration of L-glutamic acid in the fermented broth reached 0.97 g./dl.

EXAMPLE 9

*Micrococcus valians* ATCC 399 was cultured in a medium containing bouillon 1%, polypepton 1%, NaCl 0.5% and yeast extract 0.1%, at 30° C. for 18 hours; and further in a main culture medium following the procedures of Example 3, at 30° C. for 72 hours. An addition of 0.01% stearic acid was made after 12 hours of cultivation, and 1.0% ethanol was added after 12, 20, 30 and 40 hours. At the end of 72 hours, 1.62 g./dl. L-glutamic acid was obtained in the broth.

EXAMPLE 10

*Brevibacterium flavum* No. 2247 (ATCC 14067) was inoculated into a medium of:

$KH_2PO_4$—0.1%
$MgSO_4 \cdot 7H_2O$—0.05%
$(NH_4)_2SO_4$—0.1%
Urea—0.25%
Aji-eki—1.5%
Thiamine-HCl—100 γ/l.
Biotin—2 γ/l.
$Mn^{++}$—2 p.p.m.
$Fe^{++}$—2 p.p.m.
Ethanol—1.0%
Propylene glycol—0.2%

The broth obtained after 20 hours at 30° C. was mixed with a main culture medium composed of:

Ethanol—2.0%
Propylene glycol—1.5%
Urea—0.25%
$KH_2PO_4$—0.2%
$MgSO_4 \cdot 7H_2O$—0.05%
Corn steep liquor—0.3%
Biotin—10 γ/l.

After 18 hours of cultivation at 28° C. with shaking, 0.05% polyoxyethylene lauryl ether was added and the medium was adjusted to pH 7 to 8 with urea solution. After 12, 18, 24, 36 and 48 hours, 2% ethanol were added. At the end of 62 hours, the amount of L-glutamic acid in the fermented broth reached 6.01 g./dl.

EXAMPLE 11

*Corynebacterium acetoacidophilum* No. 410 (ATCC 13870) was inoculated in a seed culture medium consisting of:

$KH_2PO_4$—0.1%
$MgSO_4 \cdot 7H_2O$—0.5%
$(NH_4)_2SO_4$—0.1%
Urea—0.25%
Aji-eki—1.0%
Thiamine-HCl—100 γ/l.
Biotin—2 γ/l.
$Mn^{++}$—2 p.p.m.
$Fe^{++}$—2 p.p.m.
Ethanol—1.5%
Acetic acid—0.3%

The broth obtained after 24 hours at 28° C. was mixed with a main culture medium comprising:

| | Percent |
|---|---|
| Ethanol | 1.0 |
| Acetic acid | 1.0 |
| $(NH_4)_2SO_4$ | 0.5 |
| Urea | 0.5 |
| $KH_2PO_4$ | 0.2 |
| $K_2HPO_4$ | 0.2 |
| $MgSO_4 \cdot 7H_2O$ | 0.05 |
| Aji-eki | 1.5 |

After 20 hours of cultivation at 30° C. with shaking, 0.02% polyoxyethylene sorbitan monopalmitate and 0.02% polyethyleneglycol monostearate were added; and after 15, 25, 35 and 45 hours, 1.5% ehanol and 2.0% $(NH_4)_2HPO_4$ were added. After 72 hours, the concentration of L-glutamic acid amounted to 2.18 g./dl.

EXAMPLE 12

*Pseudomonas dacunhae* B402 (ATCC 21192) was cultured at 28° C. for 18 hours in a seed culture medium consisting of:

| | Percent |
|---|---|
| $(NH_4)_2HPO_4$ | 0.5 |
| $KH_2PO_4$ | 0.2 |
| $K_2HPO_4$ | 0.5 |
| $MgSO_4 \cdot 7H_2O$ | 0.05 |
| Yeast extract | 0.05 |
| Aji-eki | 1.0 |
| Ethanol | 1.0 |
| Propyleneglycol | 0.2 |

250 ml. of the resulting broth were transferred to 5 liters of a main culture medium in a 10-liter jar-fermentor which was kept at 30° C. with agitation. The main culture medium consisted of:

Ethanol—1.0%
$KH_2PO_4$—0.1%
Urea—0.5%
$(NH_4)_2SO_4$—0.3%
$MgSO_4 \cdot 7H_2O$—0.05%
Aji-eki—1.0%
$Fe^{++}$—2 p.p.m.
$Mn^{++}$—2 p.p.m.

During fermentation, the pH was kept at 6 to 8 with 15% aqueous ammonia solution, and ethanol was supplied with the air of aeration so as to maintain an ethanol concentration in the culture medium of not more than 1.0%. After 62 hours, the concentration of L-glutamic acid in the fermented broth was 0.38 g./dl.

EXAMPLE 13

A seed culture of *Corynebacterium equi* ATCC 6939 was prepared as described in Example 1 and was inoculated into a main culture medium composed of:

Ethanol—2.0%
Normal alkanes—1.5%
$NH_4Cl$—0.5%
$KH_2PO_4$—0.1%
$K_2HPO_4$—0.4%
$MgSO_4 \cdot 7H_2O$—0.05%
Corn steep liquor—0.4%
Biotin—2 γ/l.
Thiamine-HCl—100 γ/l.

In the course of fermentation, the pH was adjusted within the range of 6 to 8 with 15% aqueous ammonia solution, and 2% ethyl alcohol was supplied after 18, 30 and 42 hours. The fermentation was carried out at 30° C. for 70 hours, at the end of which the concentration of L-glutamic acid in the fermented broth amounted to 2.15 g./dl.

EXAMPLE 14

A culture broth of *Candida lipolytica* ATCC 8661 was prepared as described in Example 5, and 1 ml. of this culture broth was inoculated into 20 ml. of culture medium in a 500-ml. Sakaguchi flask, the medium having a composition of:

| | Percent |
|---|---|
| Ethanol | 2.0 |
| Gas oil | 1.0 |
| $NH_4NO_3$ | 1.0 |
| $KH_2PO_4$ | 0.25 |
| $MgSO_4 \cdot 7H_2O$ | 0.05 |
| Yeast extract | 0.01 |
| Polypepton | 0.01 |
| pH 7.0 | |

The medium was fermented with shaking at 30° C. After 12, 18 and 24 hours, 2% ethyl alcohol and 0.5% $NH_4NO_3$ were added, and the fermentation was continued. At the end of 42 hours, the amount of L-glutamic acid accumulated in the culture broth was 0.67 g./dl.

What is claimed is:

1. In a method of producing L-glutamic acid by culturing a microorganism under aerobic conditions on a nutrient medium including a source of assimilable carbon, a source of assimilable nitrogen, and minor nutrients, and recovering L-glutamic acid values from said medium, the improvement which consists in said source of carbon being constituted during said culturing principally by ethanol in a concentration effective for production of said L-glutamic acid but of not more than 10 percent by weight of said medium, and said microorganism being a yeast or a bacterium capable of forming L-glutamic acid by metabolizing said ethanol as a source of carbon.

2. In a method as set forth in claim 1, said microorganism being a bacterium of the genera Brevibacterium, Micrococcus, Microbacterium, Corynebacterium, Pseudomonas, Alcaligenes, Bacillus, Arthrobacter, Aerobacter, Escherichia, Xanthomonas, Proteus, Flavobacterium, Achromobacter, or Serrattia, or a yeast of the genera Saccharomyces, Candida, Hansenula, Mycotorula, Pichia, Torula, Torulaspora, or Torulopsis.

3. In a method as set forth in claim 1, said nutrient medium during said culturing being maintained at a pH between 6 and 9 and at a temperature between 20° and 35° C.

4. In a method as set forth in claim 1, the concentration of said ethanol in said medium being maintained by replenishing said nutrient medium with said ethanol during said culturing.

5. In a method as set forth in claim 4, said nutrient medium being kept under aerobic conditions by passing a stream of oxygen bearing gas through said medium, the medium being replenished with said ethanol by admixing the same to said stream.

6. A method as set forth in claim 1, said source of carbon being constituted in part by an amount of a hydrocarbon, a glycol, or acetic acid substantially smaller than the amount of said ethanol.

7. A method as set forth in claim 1, wherein said medium includes an addition agent which is a non-ionic surface active agent or a higher fatty acid in an amount effective to increase the yield of said L-glutamic acid.

8. A method as set forth in claim 7, wherein said addition agent is a polyoxyethylene sorbitan ester, a sorbitan fatty acid ester, a polyethyleneglycol fatty acid ester, a polyoxyethylene alkyl ether, a monoglyceride, or a sucrose fatty acid ester.

9. A method as set forth in claim 8, wherein the amount of said addition agent is between 0.0001 and 0.5 percent, based on the weight of said culture medium.

10. A method as set forth in claim 1, wherein the amount of said ethanol available to said microorganism during said culturing as an assimilable source of carbon is greater than the amount of all other assimilable carbon sources available during said culturing.

References Cited

UNITED STATES PATENTS 3,212,994   10/1965   Kono et al. _____ 195—47

OTHER REFERENCES

Mahler et al., "Biol. Chem.," p. 434, 1966.
Hockenhull, Prog. in Indust. Microbiol., vol. 5, pp. 61–2, 1964.
Abe et al., Chemical Abstracts, vol. 63, 1965, entry 17098a.
Milhaud et al., Ibid, 1956, entry 3549d.

A. LOUIS MONACELL, Primary Examiner

M. D. HENSLEY, Assistant Examiner